(12) United States Patent
Slupe et al.

(10) Patent No.: US 6,504,555 B1
(45) Date of Patent: Jan. 7, 2003

(54) SYSTEM AND METHOD FOR DEFINING A USER INTERFACE

(75) Inventors: James P. Slupe, Caldwell, ID (US); Angela Kay Hanson, Eagle, ID (US); Terry P. Mahoney, Boise, ID (US); Peter Wang, Boise, ID (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/313,891

(22) Filed: May 18, 1999

(51) Int. Cl.[7] ................................................. G09G 5/00
(52) U.S. Cl. ..................... 345/762; 345/866; 345/744; 345/746
(58) Field of Search ......................... 345/762, 864, 345/866, 738, 744, 746, 747, 748, 749

(56) References Cited

U.S. PATENT DOCUMENTS 5,937,150 A * 8/1999 Phan ........................... 358/1.15
6,292,271 B1 * 9/2001 Phan ............................ 358/440

FOREIGN PATENT DOCUMENTS

| EP | 0622729 A | 11/1994 |
| EP | 0671678 A | 3/1995 |
| EP | 0858022 A | 8/1998 |
| WO | WO99/49390 A | 9/1999 |

* cited by examiner

*Primary Examiner*—Ba Huynh

(57) ABSTRACT

A system and method define a user interface for a device. The user interface is any form of communication that provides information to the user. The user interface is input to the device. The user interface is stored in a location accessible by the device. The user interface is associated with a device event. When the device event occurs, the user interface is provided to the user.

12 Claims, 2 Drawing Sheets

SYSTEM AND METHOD FOR DEFINING A USER INTERFACE

FIELD OF THE INVENTION

This invention relates in general to user interface technology and, more particularly, to a system and method for defining a user configurable user interface.

BACKGROUND OF THE INVENTION

User interfaces convey information to a user about the status or configuration of a device. User interfaces may take any form, including a visual display or a sound. Conventional user interfaces are pre-defined at the factory where they are manufactured and cannot be configured or modified by a user. The character sets for the user interfaces are conventionally stored in read only memory (ROM) accessible by the device.

The user interface may be provided on the device such as on a display screen or through a speaker. Alternatively, the user interface may be transmitted to another device or output on a printed page.

Since conventional user interfaces cannot be modified or configured by a user, they do not lend themselves to universal localization and they do not have the flexibility of communicating information that is user defined. For example, if a printer is capable of displaying latin characters (such as English), it does not lend itself to conveying traditional character sets for non-latin countries (such as China). Thus, if a user in a non-English speaking country gets the message "Tray 2 Type=Plain*" the user must look the message up in a user's manual to understand what the message means.

To make available to the end user in many non-English speaking countries the user's complete character set for display on a user interface would require an enormous amount of ROM. In addition, a very complex and difficult human interface would have to be designed in order for the user to be able to access the appropriate character (s) in ROM for use at the user interface.

Some user interfaces have made alternate character sets available. However, the alternate character sets have been subsets or alternatives to the native language of a single country.

SUMMARY OF THE INVENTION

According to principles of the present invention, a system and method define a user interface for a device. The user interface is any form of communication that provides information to the user. The user interface is input to the device. The user interface is stored in a location accessible by the device. The user interface is associated with a device event. When the device event occurs, the user interface is provided to the user.

This invention will enable a user of a device to modify the manner in which the device's user interface communicates. This is accomplished by placing user defined values into the structure of the user interface.

Other objects, advantages, and capabilities of the present invention will become more apparent as the description proceeds.

DETAILED DESCRIPTION OF THE INVENTION

Figure 1:
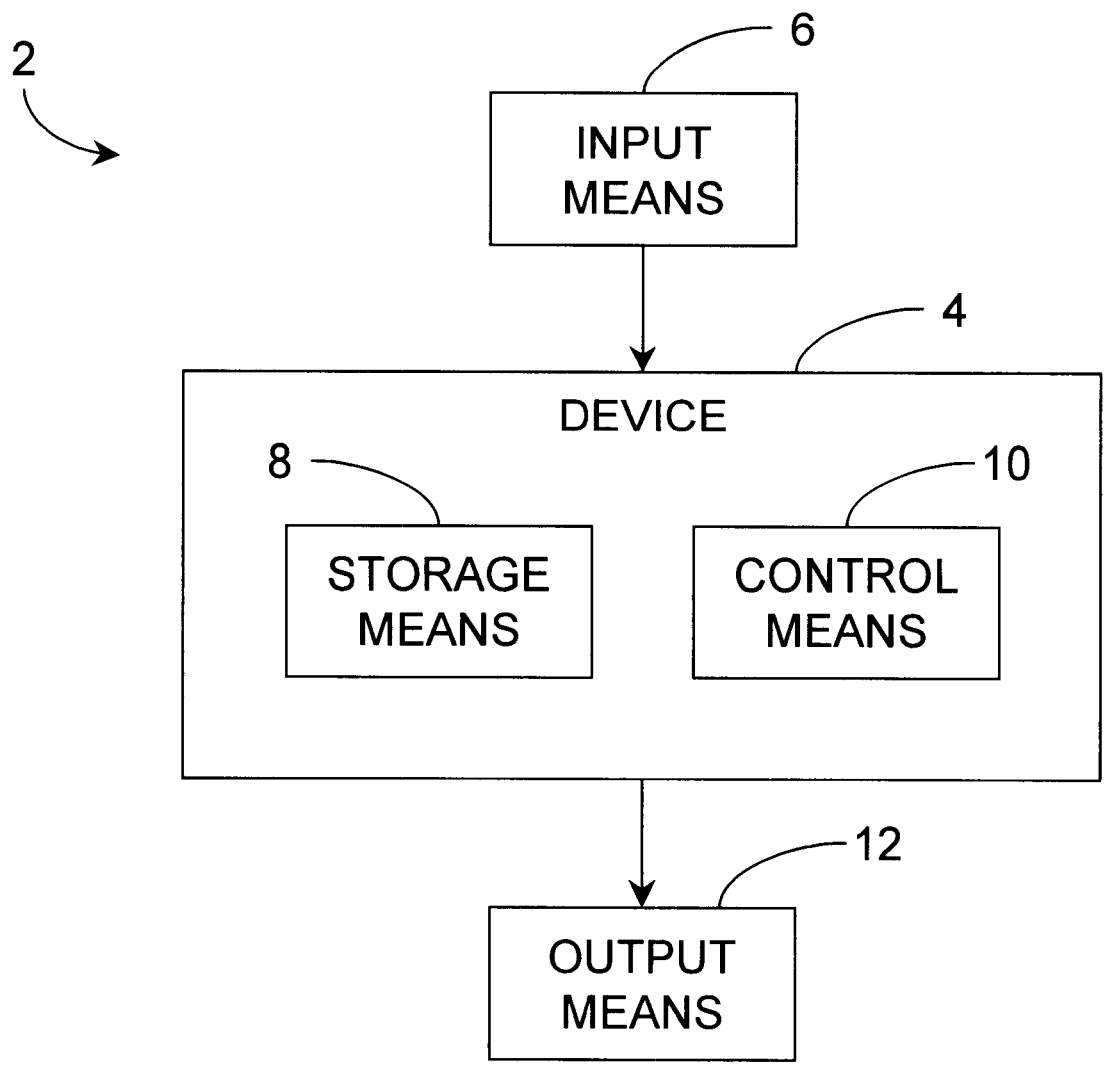
FIG. 1 is a block diagram of one embodiment of the present invention.

FIG. 1 illustrates one embodiment of a system 2 for defining a user interface for a device 4. Device 4 is any device that makes use of a user interface. For example, device 4 may be a peripheral device or a test instrument.

A peripheral device is a special purpose device for interfacing with a general purpose computer. Typically peripheral devices have a primary purpose of converting data between a physical media and an electronic bit stream. Examples of a peripheral device include a printer, a scanner, and a multifunction peripheral (MFP).

A test instrument is a special purpose device for reading or producing digital or analog information. Examples of test instruments include oscilloscopes, wave form generators, and frequency analyzers.

System 2 includes input means 6, storage means 8, control means 10 for deciding when to output the user interface, and output means 12. Input means 6 is a device or system by which the user is able to render a user interface and transfer the user interface to device 4 or storage means 8. The user interface conveys device information to the user in a fashion the user will understand. The user interface may be a flashing sequence of a light emitting diode (LED), a graphic display, a sound, or any means for conveying information to a user. The user interface might be a user defined string displayed on a remote computer. It might be a sound produced under certain conditions defined by the user. It might be any way that the device can communicate with a user's senses. Rendering the user interface is accomplished in any manner by which a user interface may be created.

In one embodiment, input means 6 is a stylus and a touch pad that recognizes user strokes to render a user interface. The stylus and touch pad may be built into device 4, or the user strokes may be conveyed to device 4 or storage means 8 through a device port or a network connection.

In another embodiment, input means 6 is a computer application that enables the user to render a user interface on a computer and convey it to device 4 or storage means 8. The user interface may be conveyed, or transferred, to device 4 or storage means 8 by any means. For example, the user interface may be transferred through a physical connection, such as a network connection, or a parallel port connection. Alternatively, the user interface may be transferred to device 4 or storage means 8 through a portable storage media, such as a floppy disk or a CD-ROM.

In still another embodiment, input means 6 is a scanning system whereby a scanable media is prepared by the user and scanned. The resulting scanned information is then transferred to device 4 or storage means 8. The scanned information may include a scanned image. It may also or instead include recognized or identified characters.

Storage means 8 is any device, media, or system capable of storing the user interface. For example, storage means 8 may be random access memory (RAM), read only memory (ROM), magnetic storage media, optical storage media, or any other storage device. Storage means 8 may be either volatile, non-volatile, or permanent. Storage means 8 is shown inside device 4. However, storage means 8 need only be accessible by device 4 and need not be located inside or as part of device 4.

Control means 10 associates the user interface with a device event. Device events include any event device 4 is able to sense, discover, or determine. For example, in a printer a device event may be low toner or an empty paper tray. Control means 10 also identifies when a device event occurs and provides the associated user interface to output means 12.

Control means 10 is any device or system capable of performing the functions described above. Control means 10 may be a single device or multiple devices or systems. In one embodiment, control means 10 is a processor. In another embodiment, control means 10 is hardwired control logic.

Output means 12 is any device or system for outputting a user interface. Since a user interface may be in many different forms, such as audible or visual, output means 12 may include many different components. Output means 12 may include a visual display component, such as an light emitting diode (LED), a liquid crystal display (LCD) panel located on device 4, or a network connection to a computer where a message is displayed on the computer's monitor. Output means 12 may also include an audio component such as a speaker built into device 4, external speakers attached to, device 4, or speakers attached to a computer having a network connection to device 4. Output means 12 may also include other types of components, such as components for producing other types of stimulus that can be sensed by a user.

The factory itself could use this method to localize a printer. In-country third parties could take advantage of this approach to provide for localization. For a simple device like a printer, the end user could redefine any entry in the menu structure to scroll the user's definition on the screen instead of the factory's. As an example, a Chinese user could label the A3 paper size tray as such in Chinese.

In order to illustrate the present invention, an example is provided below. The purpose of the example is to provide an understanding of how the components of the present invention work together. The example is not intended to limit the scope of the present invention to the specific embodiments discussed below.

Figure 2:
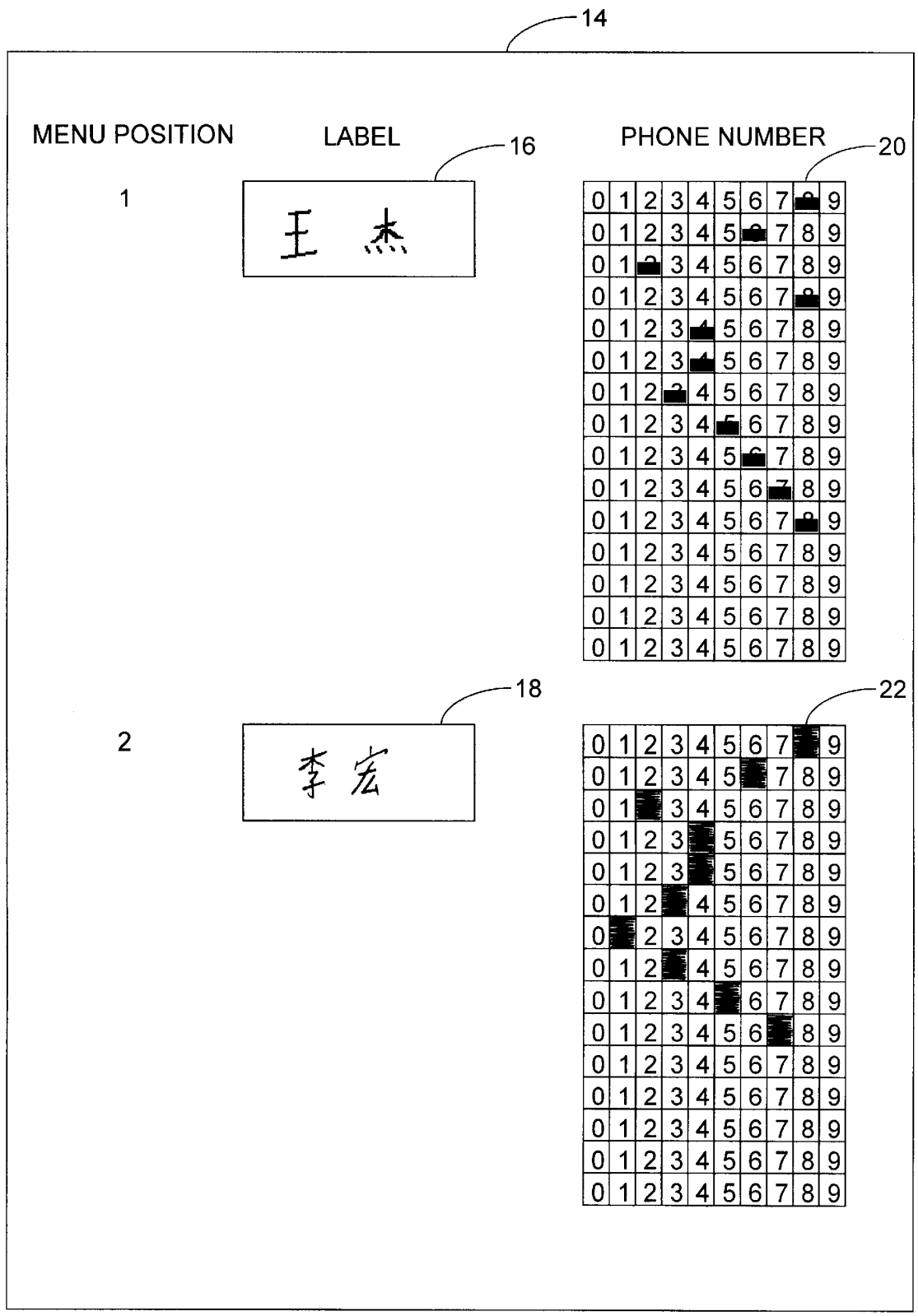
FIG. 2 is an example of one embodiment of a scanable update page.

A multifunction device (MFP) scans a paper page 14, illustrated in FIG. 2, designed to be recognized by the MFP as a user interface update page 14. Page 14 is used to assign a user written name 16, 18 to be displayed on the front panel of the MFP and associated with a button of the MFP. Page 14 also contains an area 20, 22 where the user blackens numbers for the machine to dial when the button associated with the user defined information is pressed.

In addition, the user could use this paper interface update approach to create non front panel messages stored in memory for use under certain conditions (e.g. a user defined malfunction message sent to maintenance personal over the network when a particular error occurs). In this way the user information need not necessarily be machine readable, but could be if a character or symbol recognition application were provided. It might be stored as a bit map, vector map, or other format.

In the example page illustrated in FIG. 2, it is assumed that the user has requested a copy of the "menu update" page 14 from the multifunction device. This example shows the first page of a multi-page form that the user could use to update the front panel. In this case the MFP has menu position 1 already loaded with a user name 16 that is displayed on the front panel and the stored (machine readable) phone number 20 used to dial the FAX number. The user is able to add a new user name 18 in menu position 2 and darken the appropriate numbers 22 to associate a phone number with the user defined information (as shown). Only the blacked out number section need be understood by the MFP to perform the dialing function. Upon completion of the page, the user would scan it back into the MFP. The new information would overwrite any previously stored information. A previously blank menu selection would take the new user provided label 18 and store it along with the associated telephone number 22 in memory.

This user information need not be machine readable, since the information need not be predefined and is not necessary to the proper functioning of the device 4. The information is only used to convey information to the user, only a storage means needs to be provided to store the user-defined information. This information is then conveyed to the interface whenever needed to communicate with a user. A ROM with all of the fonts for a particular country need not be provided for this purpose. A complex user interface to select an appropriate character sequence from ROM need not be designed.

It should be understood that the foregoing description is only illustrative of the invention. Various alternatives and modifications can be devised by those skilled in the art without departing from the invention. Accordingly, the present invention is intended to embrace all such alternatives, modifications and variances that fall within the scope of the appended claims.

What is claimed is:

1. A method for defining a user interface for a peripheral device, the method comprising:

(a) rendering a user interface on the peripheral device, wherein rendering the user interface on the peripheral device includes scanning the user interface into the peripheral device.

(b) storing the user interface at a location accessible by the peripheral device;

(c) associating the user interface with a peripheral device event; and, wherein the user interface is provided to the user by the peripheral device when the peripheral device event occurs.

2. The method of claim 1 wherein providing the user interface includes visually displaying the user interface.

3. The method of claim 1 wherein providing the user interface includes audibly sounding the user interface.

4. A system for defining a user interface for a peripheral device, the system comprising:

(a) means for rendering a user interface on the peripheral device, wherein the means for rendering the user interface on the peripheral device includes a scanner configured to scan the user interface into the peripheral device;

(b) means for storing the user interface;

(c) means for associating the user interface with an event of the peripheral device;

(d) means for accessing the stored user interface; and, (e) means for providing the stored user interface to the user.

5. The system of claim 4 wherein the means for providing the user interface includes means for visually displaying the user interface.

6. The system of claim 4 wherein the means for providing the user interface includes means for audibly sounding the user interface.

7. A method for defining a user interface for a test instrument, the method comprising:

(a) rendering a user interface on the test instrument, wherein rendering the user interface on the test instrument includes scanning the user interface into the test instrument, (b) storing the user interface at a location accessible by the test instrument;

(c) associating the user interface with a test instrument event; and, wherein the user interface is provided to the user by the test instrument when the test instrument event occurs.

8. The method of claim 7 wherein providing the user interface includes visually displaying the user interface.

9. The method of claim 7 wherein providing the user interface includes audibly sounding the user interface.

10. A system for defining a user interface for a test instrument, the system comprising:

(a) means for rendering a user interface on the test instrument, wherein the means for rendering the user interface on the test instrument includes a scanner configured to scan the user interface into the test instrument;

(b) means for storing the user interface;

(c) means for associating the user interface with an event of the test instrument;

(d) means for accessing the stored user interface; and, (e) means for providing the stored user interface to the user.

11. The system of claim 10 wherein the means for providing the user interface includes means for visually displaying the user interface.

12. The system of claim 10 wherein the means for providing the user interface includes means for audibly sounding the user interface.

* * * * *